US009824240B2

(12) United States Patent
Kim et al.

(10) Patent No.: US 9,824,240 B2
(45) Date of Patent: Nov. 21, 2017

(54) APPARATUS AND METHOD FOR USING MEMORY DEVICE

(71) Applicant: Samsung Electronics Co., Ltd., Gyeonggi-do (KR)

(72) Inventors: In-Kyo Kim, Seoul (KR); Jae-Bum Lee, Gyeonggi-do (KR); Hyoung-Suk Jang, Gyeonggi-do (KR); Do-Young Kim, Gyeonggi-do (KR); Yong Chang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 25 days.

(21) Appl. No.: 14/079,288

(22) Filed: Nov. 13, 2013

(65) Prior Publication Data

US 2014/0136845 A1   May 15, 2014

(30) Foreign Application Priority Data

Nov. 13, 2012  (KR) .................. 10-2012-0127875

(51) Int. Cl.
*G06F 21/78*   (2013.01)

(52) U.S. Cl.
CPC .................. *G06F 21/78* (2013.01)

(58) Field of Classification Search
CPC .... G06F 17/30312; G06F 21/78; G06F 12/14; G06F 21/805; H04L 63/0869
USPC .................. 713/1, 169, 170, 179, 155, 165
See application file for complete search history.

(56) References Cited

U.S. PATENT DOCUMENTS

| 7,234,061 B1* | 6/2007 | Diab ..................... H04L 9/3236 380/2 |
| 7,657,562 B2* | 2/2010 | Inoue ............... G11B 20/00086 386/243 |
| 8,645,375 B1* | 2/2014 | Liberty ................ G06Q 30/016 707/732 |
| 2001/0037378 A1* | 11/2001 | Hirayama .............. G06Q 20/40 709/219 |
| 2002/0049037 A1* | 4/2002 | Christensen et al. ........ 455/3.06 |
| 2003/0097340 A1* | 5/2003 | Okamoto ................ G06F 21/10 705/65 |
| 2006/0093312 A1* | 5/2006 | Park ....................... G11B 20/10 386/240 |
| 2007/0041030 A1* | 2/2007 | Kojima ................ H04N 1/2112 358/1.13 |
| 2007/0190929 A1* | 8/2007 | Sato ....................... G11B 27/34 455/3.06 |
| 2008/0068962 A1* | 3/2008 | Hirabayashi ........... G11B 20/10 369/83 |
| 2008/0120341 A1* | 5/2008 | Takatsuka ......... G06F 17/30038 |

(Continued)

FOREIGN PATENT DOCUMENTS

KR   1020050056510   6/2005

*Primary Examiner* — Abu Sholeman
(74) *Attorney, Agent, or Firm* — The Farrell Law Firm, P.C.

(57) ABSTRACT

A method and an apparatus for using a memory device are provided. A host device includes a transmitter that transmits data; a receiver that receives data; and a controller configured to receive configuration information of the memory device including the information related to the data stored in the one or more slots determined according to each vendor of the memory device, identify information related to predetermined data in the configuration data of the memory device, and receive the predetermined data from the memory device.

5 Claims, 4 Drawing Sheets

(56) References Cited

U.S. PATENT DOCUMENTS

| | | | |
|---|---|---|---|
| 2009/0102848 A1* | 4/2009 | Park | H04N 7/17318 345/440 |
| 2010/0174740 A1* | 7/2010 | Ge | H04L 12/4633 707/769 |
| 2011/0016198 A1* | 1/2011 | Shishido | G11B 27/105 709/219 |
| 2011/0131256 A1* | 6/2011 | Kim | G06K 7/0021 707/822 |
| 2012/0066513 A1* | 3/2012 | Kang | H04L 63/067 713/189 |
| 2012/0066774 A1* | 3/2012 | Kang | H04L 9/0656 726/34 |
| 2012/0089843 A1* | 4/2012 | Kato | G06F 21/10 713/176 |
| 2013/0013846 A1* | 1/2013 | Lo | G06F 3/0619 711/102 |
| 2013/0041927 A1* | 2/2013 | Song | G06F 3/0608 707/813 |
| 2013/0089843 A1* | 4/2013 | Hutchison | 434/247 |
| 2013/0132719 A1* | 5/2013 | Kobayashi | G06F 21/10 713/158 |
| 2013/0138783 A1* | 5/2013 | Mallur | G06F 8/65 709/221 |
| 2014/0108440 A1* | 4/2014 | Nos | G06F 17/3023 707/758 |
| 2015/0081565 A1* | 3/2015 | Roullier | G06Q 30/0242 705/64 |

* cited by examiner

APPARATUS AND METHOD FOR USING MEMORY DEVICE

PRIORITY

This application claims priority under 35 U.S.C. §119(a) to Korean Application Serial No. 10-2012-0127875, which was filed in the Korean Intellectual Property Office on Nov. 13, 2012, the entire content of which is incorporated herein by reference.

BACKGROUND

1. Field of the Invention

The present invention relates to a method and an apparatus for efficiently using a memory device.

2. Description of the Related Art

A flash memory is a non-volatile memory which continuously receives power, in which contents can be erased in units of blocks and can be input again. The flash memory corresponds to one type of memory transformed from an Electrically Erasable and Programmable Read Only Memory (EEPROM), and is faster than the EEPROM which erases or modifies data at a byte level, while the flash memory modifies data in units of blocks. Accordingly, the flash memory can be used for storing control codes, such as a Basic Input Output System (BIOS) of a Personal Computer (PC).

An Enhanced Media IDentification (EMID) technique for the security of data stored in the flash memory refers to a technique that physically embeds a unique ID to each flash memory during a flash memory manufacturing process. Accordingly, the data stored in the flash memory is stored using a unique EMID specific to a flash memory chip, and the stored data binds in a particular flash memory. As a result, the data cannot be decoded if the data is copied to another flash memory, which provides security. Further, in order to make better use of the unique ID, the flash memory includes limited slots used for respective applications. That is, the parallel use of the EMID and the slot of the flash memory guarantees independent security of applications.

A configuration of the EMID slot stored in the flash memory is equally determined regardless of a vendor manufacturing the flash memory. Accordingly, a flash memory's vendor is required to store data suitable for a configuration of an EMID slot stored in a predetermined flash memory. Since the type of data, an application, and a category may vary depending on a vendor, it is difficult to efficiently use EMID slots within the flash memory due to limited resources.

SUMMARY

The present invention has been made to address at least the problems and disadvantages described above and to provide at least the advantages described below. Accordingly, an aspect of the present invention provides a method and an apparatus for efficiently using a memory device.

Another aspect of the present invention provides a method and an apparatus for using a memory device which can differently determine a configuration of data slots stored in a memory device according to a vendor of the memory device.

In accordance with an aspect of the present invention, a host device using a memory device including one or more slots for storing information related to stored data is provided. The host device includes a transmitter that transmits data; a receiver that receives data; and a controller configured to receive configuration information of the memory device including the information related to the data stored in the one or more slots determined according to each vendor of the memory device, identify information related to predetermined data in the configuration data of the memory device, and receive the predetermined data from the memory device.

In accordance with another aspect of the present invention, a memory device is provided. The memory device includes a data unit configured to store data; a slot unit including one or more slots configured to store information related to stored data; and a controller configured to store the information related to the data in the one or more slots according to configuration information of the memory device including the information related to the data stored in the one or more slots determined according to each vendor of the memory device, the configuration information being transmitted from a server.

In accordance with another aspect of the present invention, a server for generating configuration information of a memory device including one or more slots storing information related to stored data is provided. The server includes a transmitter that transmits data; a receiver that receives data; and a controller configured to generate the configuration information of the memory device including the information related to the data stored in the one or more slots determined according to each vendor of the memory device, and transmit the generated configuration information of the memory device to at least one of a vendor of the memory device and a host device using the memory device.

In accordance with another aspect of the present invention, a method of using a memory device including one or more slots storing information related to stored data by a host device is provided. The method includes receiving configuration information of the memory device including the information related to the data stored in the one or more slots determined according to each vendor of the memory device from a server; identifying information related to predetermined data which the host device desires to use in the configuration data of the memory device; and acquiring a security key of the predetermined data to use the predetermined data.

In accordance with another aspect of the present invention, a method of storing data in a memory device including one or more slots storing information related to stored data is provided. The method includes receiving configuration information of the memory device including the information related to the data stored in the one or more slots determined according to each vendor of the memory device from a server; and storing the information related to the data in the one or more slots according to the configuration information of the memory device.

In accordance with another aspect of the present invention, a method of generating configuration information of a memory device including one or more slots storing information related to stored data by a server is provided. The method includes generating configuration information of the memory device including the information related to the data stored in the one or more slots determined according to each vendor of the memory device; and transmitting the generated configuration information of the memory device to at least one of a vendor of the memory device and a host device using the memory device.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the following description of the present invention, a detailed description of known functions and configurations incorporated herein will be omitted when it may make the subject matter of the present invention unclear.

Figure 1:
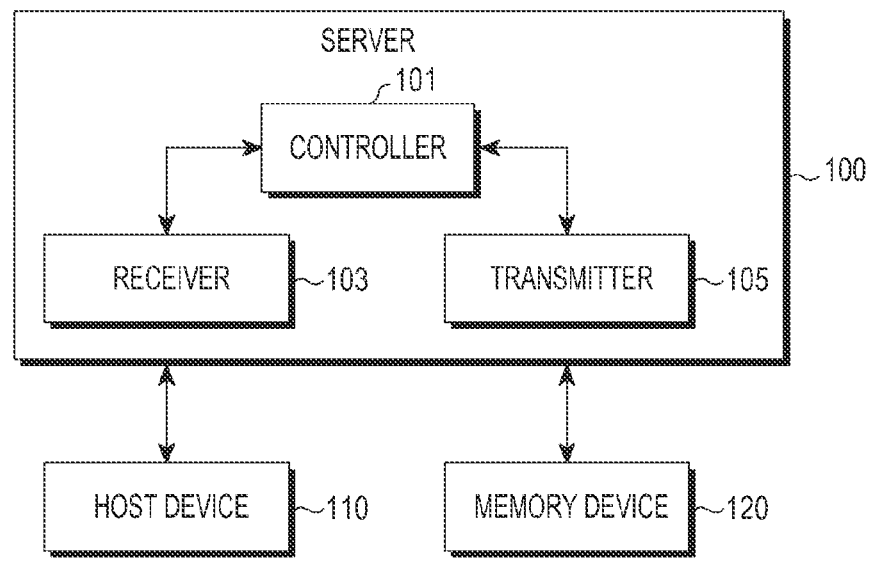
FIG. 1 is a block diagram illustrating a system for using a memory device according to an embodiment of the present invention.

FIG. 1 is a block diagram illustrating a system for using a memory device according to an embodiment of the present invention.

Referring to FIG. 1, the system for using the memory device according to the present invention includes a server 100, a host device 110, and a memory device 120.

The server 100 generates a configuration table of the memory device 120 including configuration information related to slots of the memory device 120 and transmits the generated configuration table to the host device 110 and a vendor of the memory device 120. The server 100 may update the configuration table as necessary. Further, the configuration table may include a security key for processing data stored in the memory device 120 and the security key may be separately provided. The server 100 includes a transmitter 105 for transmitting data, a receiver 103 for receiving data, and a controller 101 for generally controlling the server 100, such as generating the configuration table.

The vendor of the memory device 120 stores data in the memory device 120 according to the configuration table received from the server 100 and sets a security key for processing the stored data such that the security key corresponds to each data. For example, the memory device 120 may correspond to a flash memory.

The host device 110 processes the data stored in the memory device 120 by using the configuration table received from the server 100 to use necessary data, and may correspond to, for example, a mobile terminal, a computer game console or machine, or the like. Further, the host device 110 includes a transmitter 105 for transmitting data, a receiver 103 for receiving data, and a controller 101 for generally controlling the memory device 120, such as using the data stored in the memory device 120 by using the configuration table.

Figure 2:
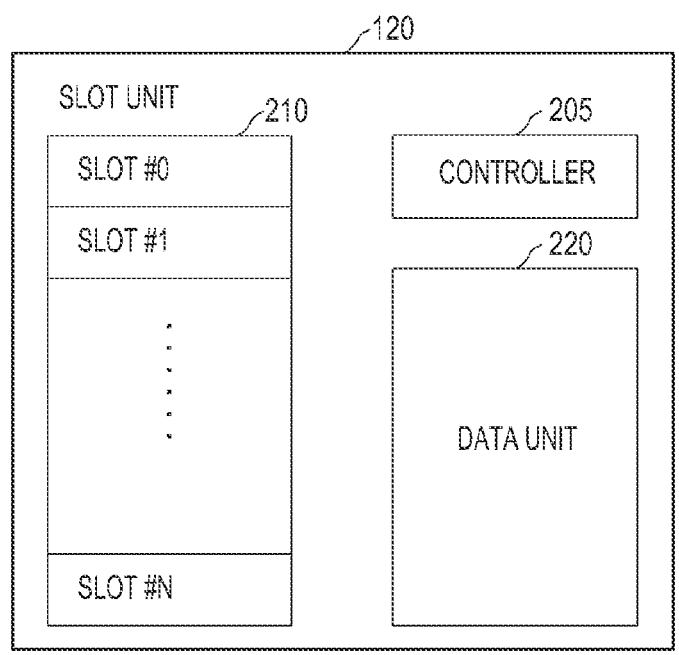
FIG. 2 illustrates a configuration of a memory device according to an embodiment of the present invention.

FIG. 2 illustrates a configuration of the memory device 120 according to an embodiment of the present invention.

Referring to FIG. 2, the memory device 120 according to an embodiment of the present invention includes a slot unit 210 and a data unit 220, and may further include a controller 205 for controlling data storage. The slot unit 210 includes a plurality of slots, and the data unit 220 stores data related to a category corresponding to each slot in an area corresponding to the slot. The category corresponding to each slot is determined according to the configuration table transmitted from the server 100, and each slot may store a security key for processing the data stored in the data unit 220. The category corresponding to each slot may correspond to, for example, a movie, a game, an e-book, a picture, and a video based on the type of data.

Figure 3:
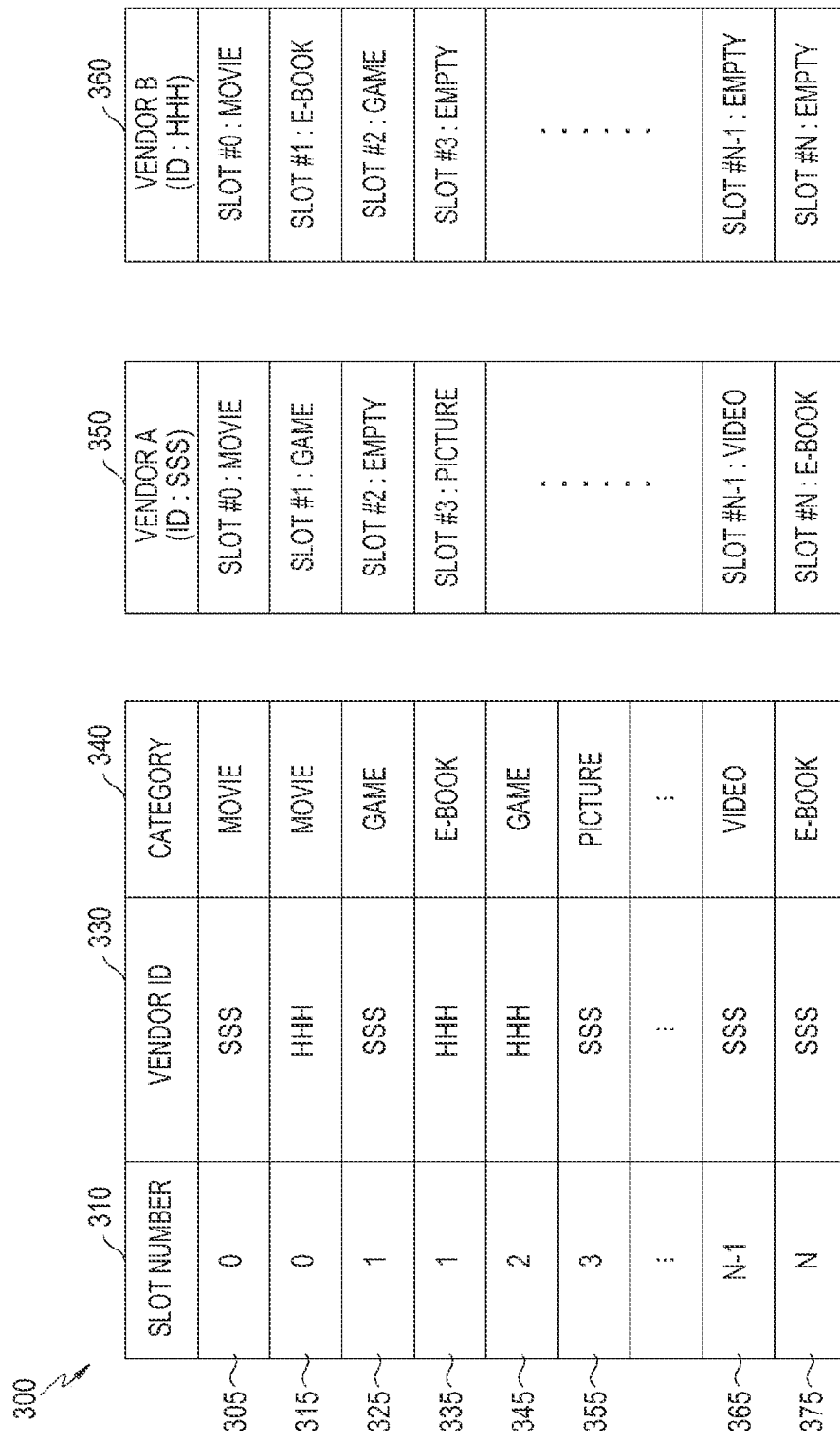
FIG. 3 is a configuration table of a memory device according to an embodiment of the present invention.

FIG. 3 is a diagram illustrating a configuration table 300 according to an embodiment of the present invention.

Referring to FIG. 3, the configuration table 300 according to the embodiment of the present invention includes at least one of a slot number 310 of each of the slots included in the slot unit 210 of the memory device 120, a category 340 corresponding to each slot, and a vendor ID 330 of the memory device 120. The categories corresponding to respective slots may vary depending on vendors.

For example, when an ID of vendor A is SSS and an ID of vendor B is HHH, vendor A may use a zero$^{th}$ slot 305 for a movie, a first slot 325 for a game, a third slot 355 for a picture, an N–1$^{th}$ slot 365 for a video, and an N$^{th}$ slot 375 for an e-book. Further, vendor B may use a zero$^{th}$ slot 315 for a movie, a first slot 335 for an e-book, and a second slot 345 for a game. If the vendor does not designate a purpose of a particular slot in the configuration table, the corresponding slot of the memory device 120 is empty, such as a second slot for vendor A and a third slot for vendor B.

The vendor of the memory device 120 determines a category of each slot of the memory device 120 manufactured by each vendor according to the configuration table. For example, when the configuration table 300 is configured as illustrated in FIG. 3, vendor A determines categories corresponding to respective slots of the memory device 120 in such a manner that a zero$^{th}$ slot is used for a movie, a first slot is used for a game, a third slot is used for a picture, an N–1$^{th}$ slot is used for a video, and an N$^{th}$ slot is used for an e-book as indicated by a reference numeral 350. Vendor B determines categories corresponding respective slots of the memory device 120 in such a manner that a zero$^{th}$ slot is used for a movie, a first slot is used for an e-book, and a second slot is used for a game as indicated by a reference numeral 360.

The configuration table may include a security key corresponding to each slot to process data stored in the memory device 120, and each slot of the memory device 120 may store a corresponding security key.

Figure 4:
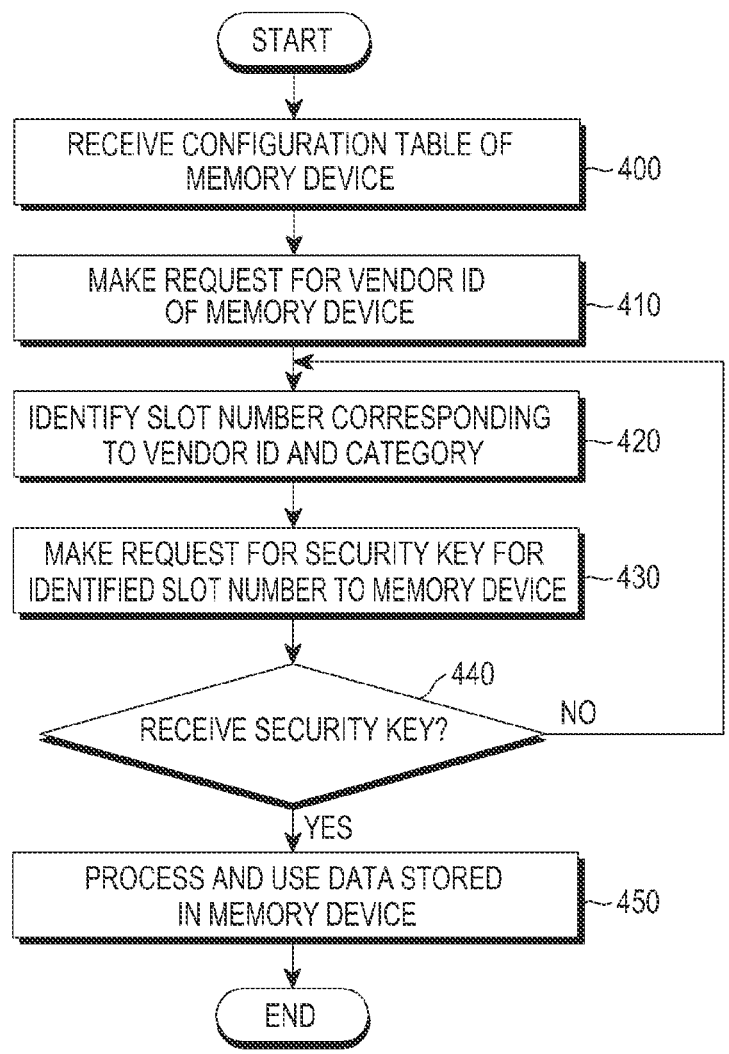
FIG. 4 is a flowchart illustrating an operation of a host device according to an embodiment of the present invention.

FIG. 4 is a flowchart illustrating an operation of the host device 110 according to an embodiment of the present invention.

Referring to FIG. 4, the host device 110 receives a configuration table from the server 100 in step 400, and then makes a request for a vendor ID of the memory device 120 to the memory device 120 in step 410. When the host device 110 receives the vendor ID from the memory device 120, the host device 110 identifies a slot number corresponding to the vendor ID and a category which the host device 110 desires to process in step 420. Thereafter, the host device 110 makes a request for a security key of the identified slot number to the memory device 120 in step 430. When the host device receives the security key in step 440, the host device 110 processes and uses the data stored in the memory device 120 in step 450. When the host device does not receive the security key in step 440, the process returns to step 420 and the host device 110 re-identifies a slot number corresponding to the vendor ID and the category which the host device 110 desires to process in the configuration table and then makes another request for a security key in step 430. When the configuration table includes a security key corresponding to each slot to process the data stored in the memory device 120, the host device 110 may acquire the security key through the configuration table.

Figure 5:
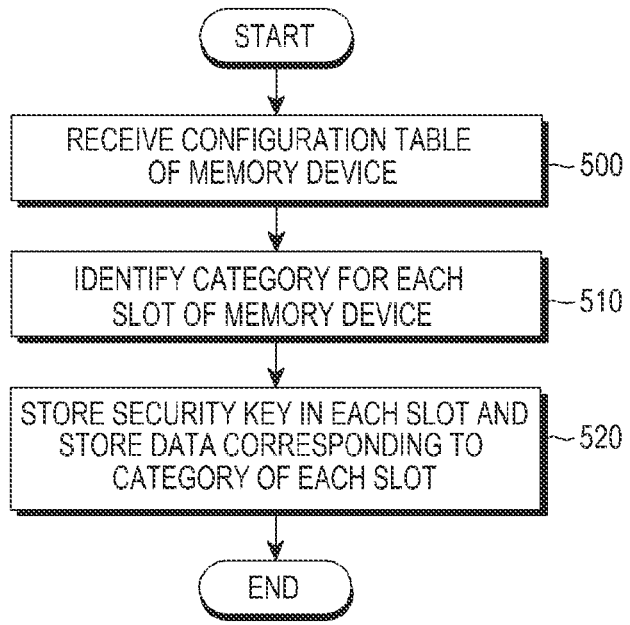
FIG. 5 is a flowchart illustrating an operation in which a vendor of a memory device configures the memory device according to an embodiment of the present invention.

FIG. 5 is a flowchart illustrating an operation in which a vendor of the memory device 120 configures the memory device 120 according to an embodiment of the present invention.

Referring to FIG. 5, when the vendor of the memory device 120 receives the configuration table from the server 100 in step 500, the vendor of the memory device 120 identifies categories of respective slots of the memory device 120 corresponding to the vendor of the memory device 120 in step 510. Thereafter, the vendor of the memory device 120 determines categories corresponding to respective slots of the memory device 120, stores security keys in the respective slots, and stores data corresponding to the categories of the respective slots in step 520.

Figure 6:
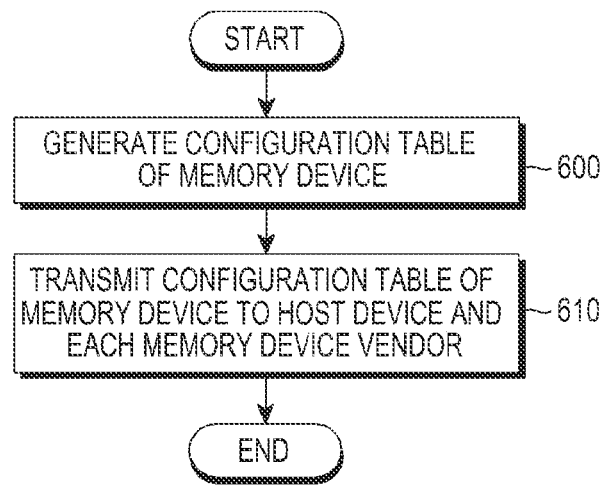
FIG. 6 is a flowchart illustrating an operation of a server according to an embodiment of the present invention.

FIG. 6 is a flowchart illustrating an operation of the server 100 according to an embodiment of the present invention.

Referring to FIG. 6, after generating the configuration table including information related to categories corresponding to respective slots of the memory device 120 according to each vendor of the memory device 120 in step 600, the server 100 transmits the configuration table to the host device and each vendor of the memory device in step 610. The configuration table may include security keys corresponding to respective slots to process data stored in the memory device 120.

Although specific embodiments have been described in the detailed descriptions of the embodiments of the present invention, it is apparent that various modifications may be carried out without departing from the scope of the present invention. Therefore, the scope of the present invention is not limited to the above described embodiments, but should be defined by the appended claims and the equivalents thereof.

What is claimed is:

1. A host device using a memory including one or more slots, the host device comprising:
   a transceiver configured to communicate with a server; and
   a controller configured;
   to receive, from the server, configuration information related to the memory, wherein the configuration information includes at least one vendor identification (ID) of at least one memory and slot mapping information corresponding to each vendor ID, the slot mapping information indicating a mapping relation between a slot of the memory and a content type to be stored in a data region of the memory corresponding to the slot, wherein the slot mapping information is varied according to the vendor ID of the memory,
   to identify a vendor ID of the memory used in the host device,
   to identify a slot corresponding to a required content using the slot mapping information of the identified vendor ID,
   to acquire a security key stored in the identified slot, and
   to acquire the required content from the data region using the acquired security key,
   wherein the configuration information includes the security key which is required for processing the content stored in the identified slot.

2. The host device of claim 1, wherein the configuration information further includes a number of each slot.

3. A server for generating configuration information of a memory including one or more slots, the server comprising:
   a transceiver configured to communicate with at least one of a host device and at least one vendor of the memory; and
   a controller configured to generate configuration information related to the memory, wherein the configuration information includes at least one vendor identification (ID) of at least one memory and slot mapping information corresponding to each vendor ID, the slot mapping information indicating a mapping relation between a slot of the memory and a content type to be stored in a data region of the memory corresponding to the slot, wherein the slot mapping information is varied according to the vendor ID of the memory, transmit the generated configuration information to at least one of the vendor of the memory and the host device using the memory, and to acquire a security key stored in the slot,
   wherein the configuration information includes the security key required for processing content stored in the slot.

4. The server of claim 3, wherein the configuration information further includes a number of each slot.

5. A method of storing data in a memory including one or more slots, the method comprising:
   receiving, from a server, by a transceiver under the control of a controller, configuration information related to the memory, wherein the configuration information includes at least one vendor identification (ID) of at least one memory and slot mapping information corresponding to each vendor ID, the slot mapping information indicating a mapping relation between a slot of the memory and a content type to be stored in a data region of the memory corresponding to the slot, wherein the slot mapping information is varied according to the vendor ID of the memory;
   acquiring using the controller a security key stored in the slot; and
   storing in the memory, at least one content in the data region based on the configuration information, wherein the configuration information includes the security key required for processing the at least one content stored in the slot.

* * * * *